United States Patent
Byun et al.

(10) Patent No.: US 12,308,172 B2
(45) Date of Patent: May 20, 2025

(54) MULTILAYER CAPACITOR AND BOARD COMPONENT HAVING THE SAME

(71) Applicant: SAMSUNG ELECTRO-MECHANICS CO., LTD., Suwon-si (KR)

(72) Inventors: Man Su Byun, Suwon-si (KR); Ho Yoon Kim, Suwon-si (KR); Min Kyoung Cheon, Suwon-si (KR); Soo Hwan Son, Suwon-si (KR); Won Chul Sim, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 266 days.

(21) Appl. No.: 17/533,582

(22) Filed: Nov. 23, 2021

(65) Prior Publication Data
US 2022/0181084 A1  Jun. 9, 2022

Related U.S. Application Data

(63) Continuation-in-part of application No. 17/230,447, filed on Apr. 14, 2021, now abandoned.

(30) Foreign Application Priority Data

Dec. 8, 2020  (KR) .................. 10-2020-0170356
Sep. 24, 2021  (KR) .................. 10-2021-0126517

(51) Int. Cl.
*H01G 4/224* (2006.01)
*H01G 4/248* (2006.01)
*H01G 4/30* (2006.01)

(52) U.S. Cl.
CPC ............. *H01G 4/224* (2013.01); *H01G 4/248* (2013.01); *H01G 4/30* (2013.01)

(58) Field of Classification Search
CPC .......... H01G 4/30; H01G 4/224; H01G 4/248; H01G 4/1227; H10G 4/1227
(Continued)

(56) References Cited

U.S. PATENT DOCUMENTS 7,813,104 B2 * 10/2010 Nakano .................. H01C 7/102
 361/321.1
10,950,385 B2  3/2021 Fukumura
(Continued)

FOREIGN PATENT DOCUMENTS

JP  5472230 B2  2/2014
KR  10-1309479 B1  9/2013
(Continued)

OTHER PUBLICATIONS

Korean Office Action dated Mar. 21, 2025 issued in Korean Patent Application No. 10-2021-0126517 (with English translation).

*Primary Examiner* — Arun Ramaswamy
(74) *Attorney, Agent, or Firm* — Morgan Lewis & Bockius LLP

(57) ABSTRACT

The present disclosure provides a multilayer capacitor and a board component having the same. The multilayer capacitor includes: a capacitor body including dielectric layers, and first and second internal electrodes that are alternately disposed with the dielectric layers interposed therebetween, and having first to sixth surfaces; first and second external electrodes disposed on opposite end portions of the capacitor body in a direction perpendicular to the third and fourth surfaces, and connected to the first and second internal electrodes, respectively; an insulator disposed on the first surface of the capacitor body; a first conductive resin layer covering the first external electrode and one end portion of the insulator in the direction; and a second conductive resin
(Continued)

layer covering the second external electrode and the other end portion of the insulator in the direction.

31 Claims, 4 Drawing Sheets

(58) Field of Classification Search
USPC ............ 361/301.4, 311, 321.1, 321.5, 321.3, 361/306.3
See application file for complete search history.

(56) References Cited

U.S. PATENT DOCUMENTS

| | | | |
|---|---|---|---|
| 2006/0087796 A1* | 4/2006 | Yamazaki | ............ C04B 35/4682 361/321.2 |
| 2013/0037911 A1 | 2/2013 | Hattori et al. | |
| 2013/0301185 A1 | 11/2013 | Lee et al. | |
| 2013/0319741 A1 | 12/2013 | Ahn et al. | |
| 2014/0083755 A1 | 3/2014 | Lee et al. | |
| 2015/0084481 A1* | 3/2015 | Mori | ....................... H01G 4/252 29/829 |
| 2015/0124370 A1* | 5/2015 | Ahn | ......................... H01G 4/12 361/272 |
| 2015/0340154 A1 | 11/2015 | Kim et al. | |
| 2018/0144864 A1* | 5/2018 | Park | ....................... H01G 4/224 |
| 2018/0160541 A1* | 6/2018 | Fujita | ..................... H01G 4/248 |
| 2019/0131076 A1* | 5/2019 | Fukumura | ............... H01G 4/232 |
| 2019/0189348 A1* | 6/2019 | Choi | ....................... H01G 4/224 |
| 2020/0273621 A1 | 8/2020 | Yi et al. | |

FOREIGN PATENT DOCUMENTS

| | | |
|---|---|---|
| KR | 10-2013-0125106 A | 11/2013 |
| KR | 10-2014-0041235 A | 4/2014 |
| KR | 10-2015-0135909 A | 12/2015 |
| KR | 10-2019-0049479 A | 5/2019 |
| KR | 10-2016501 B1 | 9/2019 |
| KR | 10-2020-0102319 A | 8/2020 |

* cited by examiner

MULTILAYER CAPACITOR AND BOARD COMPONENT HAVING THE SAME

CROSS-REFERENCE TO RELATED APPLICATION(S)

This application claims benefit of priority to Korean Patent Application No. 10-2020-0170356 filed on Dec. 8, 2020 in the Korean Intellectual Property Office, and Korean Patent Application No. 10-2021-0126517 filed on Sep. 24, 2021 in the Korean Intellectual Property Office, the disclosure of which is incorporated herein by reference in its entirety.

TECHNICAL FIELD

The present disclosure relates to a multilayer capacitor and a board component having the same.

BACKGROUND

A multilayer capacitor may have a structure in which a plurality of dielectric layers and internal electrodes having different polarities and alternately disposed with the dielectric layers interposed between the plurality of internal electrodes are stacked.

Here, since the dielectric layers have piezoelectric properties, when direct current (DC) or alternating current (AC) voltages are applied to the multilayer capacitor, a piezoelectric phenomenon may occur between the internal electrodes to generate periodical vibrations expanding and contracting the volume of a capacitor body depending on a frequency.

Such vibrations may be transferred to a board through external electrodes of the multilayer capacitor and solders connecting the external electrodes and the board to each other, such that the entirety of the board may serve as a sound reflecting surface to generate vibration sound, experienced as noise.

The vibration sound may correspond to an audio frequency in a range of 20 to 20,000 Hz causing listener discomfort. The vibration sound causing listener discomfort, as described above, is known as acoustic noise.

SUMMARY

An aspect of the present disclosure may provide a multilayer capacitor generating less acoustic noise, and a board component having the same.

According to an aspect of the present disclosure, a multilayer capacitor may include: a capacitor body including dielectric layers, and first and second internal electrodes that are alternately disposed with the dielectric layers interposed therebetween, and having first and second surfaces opposing each other, third and fourth surfaces connected to the first and second surfaces and opposing each other, and fifth and sixth surfaces connected to the first to fourth surfaces, and opposing each other; first and second external electrodes disposed on opposite end portions of the capacitor body in a direction perpendicular to the third and fourth surfaces, and connected to the first and second internal electrodes, respectively; an insulator disposed on the first surface of the capacitor body; a first conductive resin layer covering the first external electrode and one end portion of the insulator in the direction; and a second conductive resin layer covering the second external electrode and the other end portion of the insulator in the direction.

The first external electrode may include a first connection portion disposed on the third surface of the capacitor body and a first band portion extending from the first connection portion onto a portion of the first surface of the capacitor body, and the second external electrode may include a second connection portion disposed on the fourth surface of the capacitor body and a second band portion extending from the second connection portion onto a portion of the first surface of the capacitor body.

The insulator may be disposed to cover the first and second band portions on the first surface of the capacitor body.

A ratio of a thickness of the insulator to a height of the multilayer capacitor may be 0.169 or less.

$t/(\frac{1}{6} \times \pi \times d^3)$ may be 12596.621815 or less, $t/(\frac{1}{6} \times \pi \times d^3)$ being a value obtained by dividing a thickness (t) of the insulator by a grain volume ($\frac{1}{6} \times \pi \times d^3$) of a grain of the dielectric layer, in which d is an average grain size of grains of the dielectric layer.

A thickness of the insulator may be 22 to 93 μm.

The first and second external electrodes may include copper (Cu).

The first and second conductive resin layers may include a conductive metal and a resin.

The insulator may include epoxy.

The multilayer capacitor may further include first and second plating layers covering the first and second conductive resin layers, respectively.

The first and second plating layers may include first and second nickel (Ni) plating layers covering, respectively, the first and second conductive resin layers, and first and second tin (Sn) plating layers covering, respectively, the first and second nickel plating layers.

The multilayer capacitor may have a length of 1.3 mm or less in the direction perpendicular to the third and fourth surfaces of the capacitor body, and have a length of 0.65 mm or less in a direction perpendicular to the fifth and sixth surfaces of the capacitor body.

Among the first and second surfaces of the capacitor body, the insulator may be disposed only on the first surface.

According to another aspect of the present disclosure, a board component having a multilayer capacitor may include: a board having first and second electrode pads disposed on one surface thereof; and the multilayer capacitor as described above. The multilayer capacitor is mounted such that the first and second plating layers are connected to the first and second electrode pads, respectively.

The first and second plating layers of the multilayer capacitor may be mounted on the first and second electrode pads, respectively, so that the insulator faces the board.

BRIEF DESCRIPTION OF DRAWINGS

The above and other aspects, features, and advantages of the present disclosure will be more clearly understood from the following detailed description taken in conjunction with the accompanying drawings, in which.

DETAILED DESCRIPTION

Figure 1:
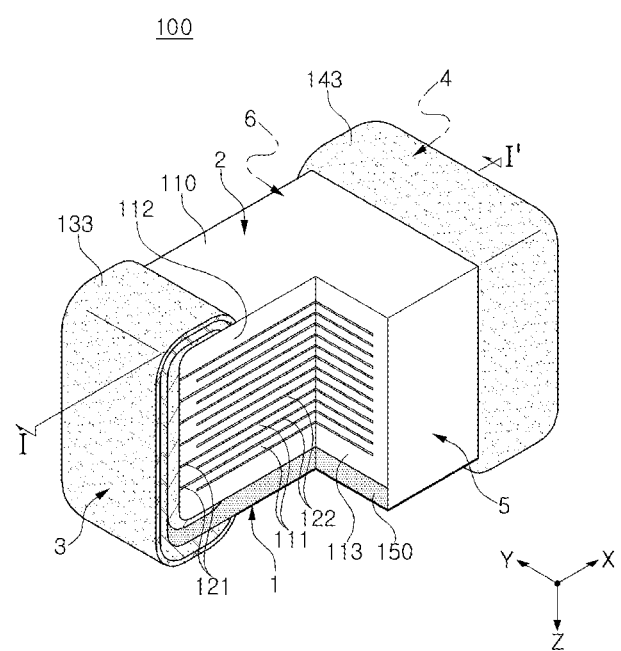
FIG. 1 is a schematic partially cut-away perspective view of a multilayer capacitor according to an exemplary embodiment in the present disclosure.

Hereinafter, exemplary embodiments in the present disclosure will be described in detail with reference to the accompanying drawings.

Directions of a capacitor body 110 will be defined in order to clearly describe exemplary embodiments in the present disclosure. X, Y and Z in the drawings refer to a length direction, a width direction, and a thickness direction of the capacitor body 110, respectively. In addition, in the present exemplary embodiment, the Z direction refers to a stacked direction in which dielectric layers 111 are stacked.

Figure 2A:
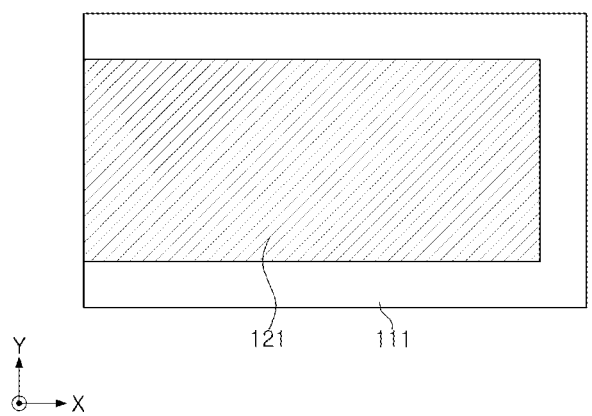
FIGS. 2A and 2B are plan views illustrating, respectively, first and second internal electrodes of FIG. 1.
Figure 2B:
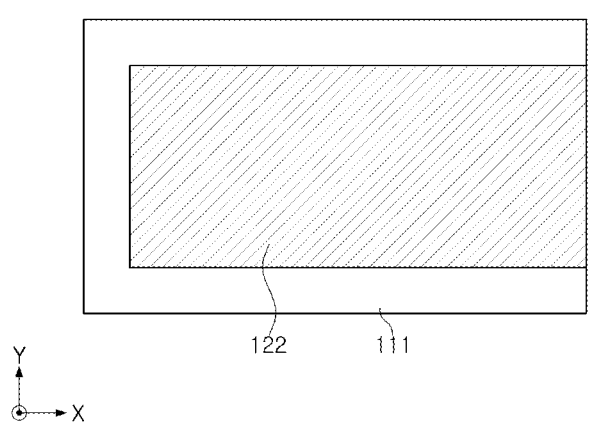
Figure 3:
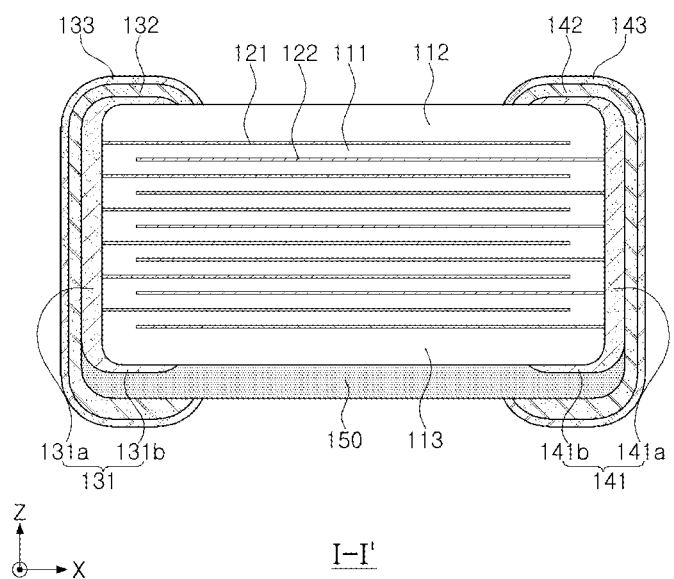
FIG. 3 is a cross-sectional view taken along line I-I' of FIG. 1.

FIG. 1 is a schematic partially cut-away perspective view of a multilayer capacitor according to an exemplary embodiment in the present disclosure, FIGS. 2A and 2B are plan views illustrating, respectively, first and second internal electrodes of FIG. 1, and FIG. 3 is a cross-sectional view taken along line I-I' of FIG. 1.

Referring to FIGS. 1 through 3, a multilayer capacitor 100 according to the present exemplary embodiment may include the capacitor body 110, first and second external electrodes 131 and 141, an insulator 150, and first and second conductive resin layers 132 and 142.

The capacitor body 110 may be formed by stacking and then sintering a plurality of dielectric layers 111 in the Z direction, and adjacent dielectric layers 111 of the capacitor body 110 may be integrated with each other so that boundaries therebetween are not readily distinguishable without using a scanning electron microscope (SEM).

Here, the capacitor body 110 may have a substantially hexahedral shape. However, the shape of the capacitor body 110 is not limited thereto. Further, the shape and dimensions of the capacitor body 110 and the number of stacked dielectric layers 111 are not limited to those illustrated in the drawings.

In the present exemplary embodiment, for convenience of explanation, first and second surfaces 1 and 2 of the capacitor body 110 refer to opposite surfaces of the capacitor body 110 opposing each other in the Z direction, third and fourth surfaces 3 and 4 of the capacitor body 110 refer to opposite surfaces of the capacitor body 110 connected to the first and second surfaces 1 and 2 and opposing each other in the X direction, and fifth and sixth surfaces 5 and 6 of the capacitor body 110 refer to opposite surfaces of the capacitor body 110 connected to the first and second surfaces land 2, connected to the third and fourth surfaces 3 and 4, and opposing each other in the Y direction.

Further, in the present exemplary embodiment, a mounting surface of the multilayer capacitor 100 may be the first surface 1 which is a lower surface of the capacity body 110 in the drawings.

The dielectric layer 111 may include a ceramic material having a high dielectric constant, such as barium titanate ($BaTiO_3$)-based ceramic powder or strontium titanate ($SrTiO_3$)-based ceramic powder. However, the material of the dielectric layer 111 is not limited thereto as long as a sufficient capacitance may be obtained.

In addition, the dielectric layer 111 may further include a ceramic additive, an organic solvent, a plasticizer, a binder, a dispersant, and the like, in addition to the ceramic powder.

Examples of the ceramic additive may include a transition metal oxide or a transition metal carbide, a rare earth element, magnesium (Mg), and aluminum (Al).

Such a capacitor body 110 may include an active region, contributing to forming capacitance of the multilayer capacitor, and upper and lower covers 112 and 113 formed as upper and lower margin portions on upper and lower surfaces of the active region in the Z direction, respectively.

The upper and lower covers 112 and 113 may be formed of the same material as that of the dielectric layer 111 and have the same configuration as that of the dielectric layers 111 except that they may not include the internal electrodes.

The upper and lower covers 112 and 113 may be formed by stacking a single dielectric layer or two or more dielectric layers on the upper and lower surfaces of the active region, respectively, in the Z direction, and may basically serve to prevent damage to the first and second internal electrodes 121 and 122 due to physical or chemical stress.

The first and second internal electrodes 121 and 122, which are electrodes to which different polarities are applied, may be alternately disposed in the Z direction with the dielectric layers 111 interposed therebetween, and one ends of the first and second internal electrodes 121 and 122 may be exposed through the third and fourth surfaces 3 and 4 of the capacitor body 110, respectively.

In this case, the first and second internal electrodes 121 and 122 may be electrically insulated from each other by the dielectric layers 111 disposed therebetween.

End portions of the first and second internal electrodes 121 and 122 alternately exposed through the third and fourth surfaces 3 and 4 of the capacitor body 110, respectively, may be electrically connected to the first and second external electrodes 131 and 141 disposed on the third and fourth surfaces 3 and 4 of the capacitor body 110 to be described below, respectively.

With the configuration as described above, when predetermined voltages are applied to the first and second external electrodes 131 and 141, electric charges may be accumulated between the first and second internal electrodes 121 and 122.

In this case, the capacitance of the multilayer capacitor 100 may be in proportion to an area of a region in which the first and second internal electrodes 121 and 122 overlap each other in the Z direction in the active region.

In addition, a material of each of the first and second internal electrodes 121 and 122 is not particularly limited, and may be a conductive paste formed of one or more of, for example, a noble metal material such as a platinum (Pt), palladium (Pd), or a palladium-silver (Pd—Ag) alloy, nickel (Ni), and copper (Cu).

In this case, a method of printing the conductive paste may be a screen-printing method, a gravure printing method, or the like, but is not limited thereto.

Voltages having different polarities may be provided to the first and second external electrodes 131 and 141, respectively, and the first and second external electrodes 131 and 141 may be disposed on opposite end portions of the capacitor body 110 in the X direction, respectively, and may be electrically connected to exposed portions of the first and second internal electrodes 121 and 122, respectively.

The first external electrode 131 may include a first connection portion 131a and a first band portion 131b.

The first connection portion 131a may be formed on the third surface 3 of the capacitor body 110 and be electrically connected to the exposed portions of the first internal electrodes 121, and the first band portion 131b may extend from the first connection portion 131a onto a portion of the first surface 1 of the capacitor body 110.

In this case, the first band portion 131b may further extend onto a portion of the second surface 2 of the capacitor body 110 and portions of the fifth and sixth surfaces 5 and 6 of the capacitor body 110, if necessary, in order to improve an adhesion strength or the like.

The second external electrode 141 may include a second connection portion 141a and a second band portion 141b.

The second connection portion 141a may be formed on the fourth surface 4 of the capacitor body 110 and be electrically connected to the exposed portions of the second internal electrodes 122, and the second band portion 141b may extend from the second connection portion 141a onto a portion of the first surface 1 of the capacitor body 110.

In this case, the second band portion 141b may further extend onto a portion of the second surface 2 of the capacitor body 110 and portions of the fifth and sixth surfaces 5 and 6 of the capacitor body 110, if necessary, in order to improve an adhesion strength or the like.

Further, the first and second external electrodes 131 and 141 may include a metal such as copper (Cu).

The insulator 150 may be disposed on the first surface 1 of the capacitor body 110.

Here, the insulator 150 may be formed of epoxy.

Further, a ratio of the thickness of the insulator 150 to a height of the multilayer capacitor 100 141 may be 0.16 9 or less.

In addition, the insulator 150 may be disposed to cover parts of the first and second band portions 131b and 141b that are formed on the first surface 1 of the capacitor body 110.

Since $r=d/2$ in $4/3 \times \pi \times r^3$, it may be taken that a grain volume of a grain of the dielectric layer 111 is $1/6 \times \pi \times d^3$, d being an average grain size of grains of the dielectric layer 111.

Therefore, a value obtained by dividing the thickness (t) of the insulator 150 by the grain volume ($1/6 \times \pi \times d^3$) of a grain of the dielectric layer 111 is $t/(1/6 \times \pi \times d^3)$. In this exemplary embodiment, $t/(1/6 \times \pi \times d^3)$ may be 12596.621815 or less.

The first conductive resin layer 132 may improve stability of the multilayer capacitor against mechanical stress, and may be formed to cover the first external electrode 131 and one end portion of the insulator 150 in the X direction.

The second conductive resin layer 142 may improve stability of the multilayer capacitor against mechanical stress, and may be formed to cover the second external electrode 141 and the other end portion of the insulator 150 in the X direction.

In addition, the first and second conductive resin layers 132 and 142 may include a conductive metal and a resin.

In this case, the conductive metal may be copper, nickel, or the like, and the resin may be epoxy.

As another example, the first and second conductive resin layers 132 and 142 may include an intermetallic compound and epoxy.

Here, an upper surface of the insulator 150 is in close contact with the first and second band portions 131b and 141b, and the first surface 1 of the capacitor body 110, opposite surfaces of the insulator 150 in the X direction are in contact with the first and second conductive resin layers 132 and 142, respectively, and opposite end portions of a lower surface of the insulator 150 in the Z direction in the X direction are in close contact with the first and second conductive resin layers 132 and 142, respectively.

Further, first and second plating layers 133 and 143 may be formed to cover the first and second conductive resin layers 132 and 142, respectively.

The first and second plating layers 133 and 143 may include first and second nickel (Ni) plating layers covering, respectively, the first and second conductive resin layers 132 and 142, and first and second tin (Sn) plating layers covering, respectively, the first and second nickel plating layers.

Figure 5:
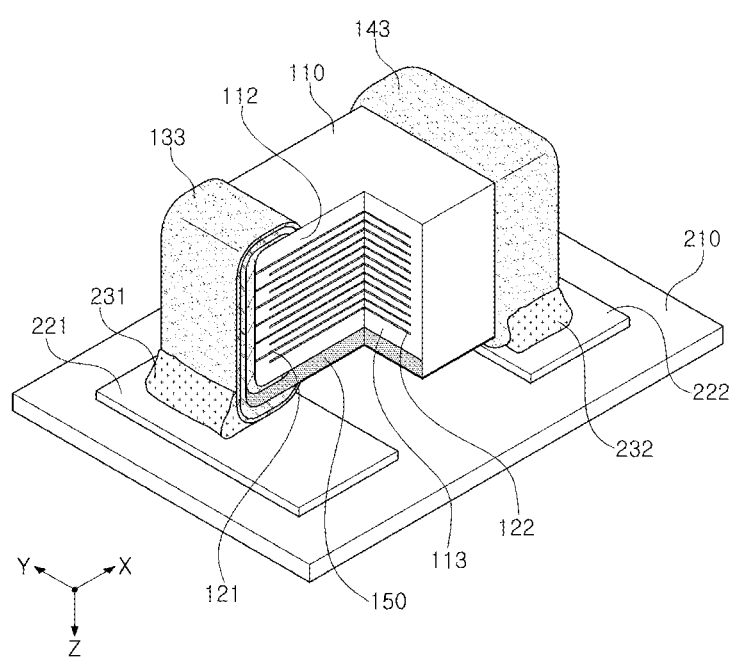
FIG. 5 is a perspective view illustrating a state in which the multilayer capacitor of FIG. 1 is mounted on a board.

FIG. 5 is a perspective view illustrating a state in which the multilayer capacitor of FIG. 1 is mounted on a board.

Referring to FIG. 5, a board component having a multilayer capacitor according to the present exemplary embodiment may include a board 210 on which the multilayer capacitor 100 is mounted, and first and second electrode pads 221 and 222 formed on an upper surface of the board 210 and be spaced apart from each other.

The multilayer capacitor 100 may be electrically connected to the board 210 by solders 231 and 232 in a state in which the first and second plating layers 133 and 143 covering the first and second external electrodes 131 and 141 are positioned on the first and second electrode pads 221 and 222, respectively, so as to be in contact with the first and second electrode pads 221 and 222, respectively.

Here, the multilayer capacitor 100 may be the multilayer capacitor according to an exemplary embodiment in the present disclosure described above. Therefore, hereinafter, a detailed description of the multilayer capacitor 100 will be omitted in order to avoid an overlapping description.

According to the present exemplary embodiment, the insulator may be disposed to be positioned under the multilayer capacitor and between the external electrodes and the conductive resin layers, such that acoustic noise may be reduced.

Particularly, in a case in which the multilayer capacitor has a small size in which a length in the X direction is 1.3 mm or less, and a length in the Y direction is 0.65 mm or less, the thickness of the structure for reducing noise is 110 μm or less, in this case, when using a printed circuit board (PCB) or an alumina board as a structure for reducing noise, a noise reduction effect is not exhibited due to productivity and a technical limitation.

However, in the present exemplary embodiment, the insulator 150 formed of epoxy resin is used as a structure for reducing acoustic noise, and the thickness of the insulator 150 may be easily adjusted. Therefore, even in a case of the multilayer capacitor having such a small size, the insulator 150 having an optimal thickness may be easily provided.

Multilayer capacitors according to inventive examples and comparative examples were manufactured as described below.

A slurry including powder such as barium titanate (BaTiO$_3$) powder was applied to carrier films and dried to prepare a plurality of ceramic green sheets having a thickness of 1.8 μm.

Then, a conductive paste for nickel internal electrodes was applied to the ceramic green sheets using a screen printing method to form internal electrodes.

About 370 ceramic green sheets on which internal electrodes are formed as described above were stacked, and ceramic green sheets on which the internal electrode is not formed were stacked on and under the stacked structure, respectively.

A laminate formed of such ceramic green sheets was isostatically pressed under a pressure of 1000 kgf/cm$^2$ at 85° C. The ceramic laminate whose pressing is completed was diced into individual chips, and the chips obtained by dicing were kept under an atmosphere at 230° C. for 60 hours for de-binding.

Then, the chips were sintered under a reduction atmosphere at 1200° C. and an oxygen partial pressure of $10^{-11}$ to $10^{-10}$ atm lower than a Ni/NiO equilibrium oxygen partial pressure, in order to prevent oxidation of the internal electrodes.

Then, external electrodes were formed, an insulator was formed, conductive resin layers were formed, and plating was performed to manufacture the multilayer capacitors. Further, acoustic noise measurement was performed by using such multilayer capacitors.

In order to measure acoustic noise, one sample (multilayer capacitor) for each acoustic noise measuring board was mounted on a printed circuit board, and the board was mounted on a measuring jig.

Then, direct current (DC) voltages and voltage variations were applied to both terminals of the sample mounted on the measuring jig by using a DC power supply and a function generator.

Acoustic noise was measured through a microphone installed immediately above the printed circuit board.

Note that the thickness of the insulator is the thickness of the thickest portion of the insulator at the center of the capacitor body on an X-Z cross section in the Y direction. Alternatively, the thickness of the insulator may be measured by using a micrometer. Other methods and/or tools appreciated by one of ordinary skill in the art, even if not described in the present disclosure, may also be used.

Further, grain sizes (or average grain sizes) used in the test were measured by performing measurement on 20 points at the center of the capacitor body on the X-Z cross section in the Y direction between the insulator and the internal electrode that is closest to the insulator, by using the SEM, and were averaged to be used as factors of the test. Other methods and/or tools appreciated by one of ordinary skill in the art, even if not described in the present disclosure, may also be used.

The grain volume was calculated as $\frac{1}{6}\times\pi\times$(average grain size$^3$), and rounded off the 7th decimal place. Here, $\pi$ was set as 3.14159265. Further, the thickness of the insulator/grain volume was rounded off the 7th decimal place.

The length of the multilayer capacitor is determined when an imaginary straight line is drawn on the X-Z cross section of the capacitor body in the X direction. Further, the length of the multilayer capacitor is the sum of the length of the capacitor body, the thickness of the first and second external electrodes formed on the third and fourth surfaces of the capacitor body, respectively, the thickness of the first and second conductive resin layers formed on the first and second external electrodes, respectively, and the thickness of the first and second plating layers formed on the first and second conductive resin layers, respectively, and is set to the maximum value among sums.

The width of the multilayer capacitor is determined when an imaginary straight line is drawn on the Y-Z cross section of the capacitor body in the Y direction. Further, the width of the multilayer capacitor is the sum of the width of the capacitor body, the thickness of the first or second external electrode formed on the fifth or sixth surfaces of the capacitor body, respectively, the thickness of the first or second conductive resin layer formed on the first or second external electrode, respectively, and the thickness of the first or second plating layer formed on the first or second conductive resin layer, respectively, and is set to the maximum value among sums.

The height of the multilayer capacitor is determined when an imaginary straight line is drawn on the X-Z cross section of the capacitor body in the Z direction. Further, the height of the multilayer capacitor is the sum of the thickness of the capacitor body, the thickness of the first or second external electrodes formed on the first and second surfaces of the capacitor body, the thickness of a portion of the insulator provided on a external electrode, the thickness of the first or second conductive resin layer formed on the upper surface of the first or second external electrode and the lower surface of the insulator, and the thickness of the first or second plating layer formed on the upper and lower surfaces of the first or second conductive resin layer, and is set to the maximum value among sums.

Further, The thickness of the insulator/height of multilayer capacitor was rounded off the fourth decimal place.

The test was performed five times for each sample to obtain average acoustic noise.

TABLE 1

| Sample No. (#) | Average Acoustic Noise (dB) | Length of multilayer capacitor (mm) | Width of multilayer capacitor (mm) | Height of multilayer capacitor (mm) | Thickness (μm) of Insulator | Average Grain Size (μm) | Grain Volume (μm$^3$) | Thickness of Insulator/ Grain Volume (μm$^{-2}$) | Thickness of Insulator/ Height of multilayer capacitor |
|---|---|---|---|---|---|---|---|---|---|
| 1 | 32.9 | 1.117 | 0.631 | 0.628 | 0.000 | 0.2715 | 0.010479 | 0 | 0 |
| 2 | 25.9 | 1.161 | 0.649 | 0.672 | 22.400 | 0.2715 | 0.010479 | 2137.608550 | 0.033 |
| 3 | 26.0 | 1.172 | 0.648 | 0.700 | 50.200 | 0.2715 | 0.010479 | 4790.533448 | 0.072 |
| 4 | 26.9 | 1.179 | 0.649 | 0.739 | 89.800 | 0.2715 | 0.010479 | 8569.519992 | 0.122 |
| 5 | 30.0 | 1.182 | 0.654 | 0.781 | 132.000 | 0.2715 | 0.010479 | 12596.621815 | 0.169 |

Table 1 shows test results of Type 1 with a capacity of 4.7 μF and a rated voltage of 10V. The insulator was not provided in #1 sample, and the thickness of the insulator was sequentially increased from #2 sample to #5 sample.

Figure 4:
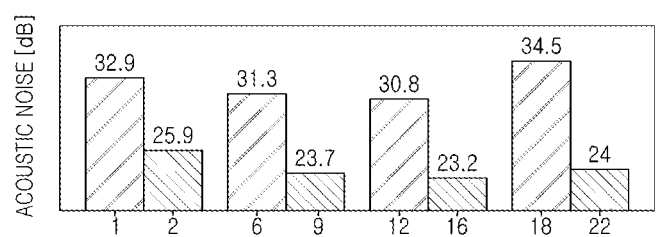
FIG. 4 is a graph illustrating results of comparison of average acoustic noise of multilayer capacitor in a case in which an insulator is not provided and average acoustic noise of multilayer capacitor in a case in which the insulator is provided.

Referring to FIG. 4 and Table 1, it may be appreciated that average acoustic noise caused by the multilayer capacitor according to the related art in which the insulator is not provided (that is, the acoustic noise caused by #1 sample) was 32.9 dB, acoustic noises caused by the multilayer capacitor s according to the inventive examples were less than that caused by #1 sample, all exhibit good acoustic noise values equal to or less than 30 dB. Further, the acoustic noise caused by #2 sample in which the thickness of the insulator is 22.4 μm was 25.9 dB, which is the least value, and acoustic noises caused by other samples were more than that of #2 sample.

TABLE 2

| Sample No. (#) | Average Acoustic Noise (dB) | Length of multilayer capacitor (mm) | Width of multilayer capacitor (mm) | Height of multilayer capacitor (mm) | Thickness (μm) of Insulator | Average Grain Size (μm) | Grain Volume (μm³) | Thickness of Insulator/ Grain Volume (μm⁻²) | Thickness of Insulator/ Height of multilayer capacitor |
|---|---|---|---|---|---|---|---|---|---|
| 6 | 31.3 | 1.170 | 0.682 | 0.662 | 0.000 | 0.2873 | 0.012417 | 0 | 0 |
| 7 | 28.7 | 1.260 | 0.740 | 0.747 | 13.200 | 0.2873 | 0.012417 | 1063.058710 | 0.018 |
| 8 | 28.1 | 1.230 | 0.738 | 0.756 | 22.100 | 0.2873 | 0.012417 | 1779.817991 | 0.029 |
| 9 | 23.7 | 1.216 | 0.742 | 0.792 | 58.500 | 0.2873 | 0.012417 | 4711.282919 | 0.074 |
| 10 | 24.4 | 1.265 | 0.758 | 0.830 | 92.867 | 0.2873 | 0.012417 | 7479.020697 | 0.112 |
| 11 | 28.0 | 1.257 | 0.751 | 0.830 | 123.172 | 0.2873 | 0.012417 | 9919.626319 | 0.148 |

Table 2 shows test results of Type 2 with a capacity of 10 μF and a rated voltage of 10V. The insulator was not provided in #6 sample, and the thickness of the insulator was sequentially increased from #7 sample to #11 sample.

Referring to FIG. 4 and Table 2, it may be appreciated that average acoustic noise caused by the multilayer capacitor according to the related art in which the insulator is not provided (that is, the acoustic noise caused by #6 sample) was 31.3 dB, acoustic noises caused by the multilayer capacitor s according to the inventive examples were less than that caused by #6 sample, all exhibit good acoustic noise values below 30 dB. Further, the acoustic noise caused by #9 sample in which the thickness of the insulator is 58.5 μm was 23.7 dB, which is the least value, and acoustic noises caused by other samples we re more than that caused by #9 sample.

TABLE 3

| Sample No. (#) | Average Acoustic Noise (dB) | Length of multilayer capacitor (mm) | Width of multilayer capacitor (mm) | Height of multilayer capacitor (mm) | Thickness (μm) of Insulator | Average Grain Size (μm) | Grain Volume (μm³) | Thickness of Insulator/ Grain Volume (μm⁻²) | Thickness of Insulator/ Height of multilayer capacitor |
|---|---|---|---|---|---|---|---|---|---|
| 12 | 30.8 | 1.254 | 0.719 | 0.626 | 0.000 | 0.2903 | 0.012810 | 0 | 0 |
| 13 | 28.5 | 1.183 | 0.763 | 0.692 | 28.350 | 0.2903 | 0.012810 | 2213.114754 | 0.041 |
| 14 | 26.6 | 1.195 | 0.764 | 0.712 | 48.650 | 0.2903 | 0.012810 | 3797.814208 | 0.068 |
| 15 | 24.4 | 1.206 | 0.769 | 0.741 | 77.950 | 0.2903 | 0.012810 | 6085.089774 | 0.105 |
| 16 | 23.2 | 1.218 | 0.775 | 0.757 | 93.250 | 0.2903 | 0.012810 | 7279.469165 | 0.123 |
| 17 | 23.7 | 1.231 | 0.781 | 0.778 | 109.072 | 0.2903 | 0.012810 | 8514.597970 | 0.140 |

Table 3 shows test results of Type 3 with a capacity of 15 μF and a rated voltage of 6.3V. The insulator was not provided in #12 sample, and the thickness of the insulator was sequentially increased from #13 sample to #17 sample.

Referring to FIG. 4 and Table 3, it may be appreciated that average acoustic noise caused by the multilayer capacitor according to the related art in which the insulator is not provided (that is, the acoustic noise caused by #12 sample) was 30.8 dB, acoustic noises caused by the multilayer capacitor s according to the inventive examples were less than that caused by #12 sample, all exhibit good acoustic noise values below 30 dB. Further, the acoustic noise caused by #16 sample in which the thickness of the insulator is 93.250 μm was 23.2 dB, which is the least value, and acoustic noises caused by other samples were more than that caused by #16 sample.

TABLE 4

| Sample No. (#) | Average Acoustic Noise (dB) | Length of multilayer capacitor (mm) | Width of multilayer capacitor (mm) | Height of multilayer capacitor (mm) | Thickness (μm) of Insulator | Average Grain Size (μm) | Grain Volume (μm$^3$) | Thickness of Insulator/ Grain Volume (μm$^{-2}$) | Thickness of Insulator/ Height of multilayer capacitor |
|---|---|---|---|---|---|---|---|---|---|
| 18 | 34.5 | 1.005 | 0.540 | 0.528 | 0.000 | 0.3330 | 0.019334 | 0 | 0 |
| 19 | 27.9 | 1.084 | 0.578 | 0.590 | 43.400 | 0.3330 | 0.019334 | 2244.750181 | 0.074 |
| 20 | 24.7 | 1.092 | 0.576 | 0.612 | 64.700 | 0.3330 | 0.019334 | 3346.436330 | 0.106 |
| 21 | 24.4 | 1.077 | 0.571 | 0.631 | 84.002 | 0.3330 | 0.019334 | 4344.781214 | 0.133 |
| 22 | 24.0 | 1.066 | 0.575 | 0.652 | 105.258 | 0.3330 | 0.019334 | 5444.19158 | 0.161 |
| 23 | 24.5 | 1.072 | 0.577 | 0.688 | 132.120 | 0.3330 | 0.019334 | 6833.557463 | 0.192 |

Table 4 shows test results of Type 4 with a capacity of 2.2 μF and a rated voltage of 10V. The insulator was not provided in #18 sample, and the thickness of the insulator was sequentially increased from #19 sample to #23 sample.

Referring to FIG. 4 and Table 4, it may be appreciated that average acoustic noise caused by the multilayer capacitor according to the related art in which the insulator is not provided (that is, the acoustic noise caused by #18 sample) was 34.5 dB, acoustic noises caused by the multilayer capacitor s according to the inventive examples were less than that caused by #18 sample, all exhibit good acoustic noise values below 30 dB. Further, the acoustic noise caused by #22 sample in which the thickness of the insulator is 105.258 μm was 24.0 dB, which is the least value, and acoustic noises other samples were more than that caused by #22 sample.

As described above, it may be appreciated that a threshold of the thickness of the insulator that reduces acoustic noise exists, and referring to Tables 1 to 4, it may be appreciated that a ratio of the thickness of the insulator to a height of the multilayer capacitor, at which the acoustic noise is minimized (30 dB or less), is 0.169 or less. In addition, the thickness of the insulator may be about 22 μm to about 93 μm.

Meanwhile, a level of reduction of the acoustic noise varies depending on a relationship between the grain volume of a grain of the dielectric layer of the multilayer capacitor and the thickness of the insulator.

Particularly, referring to Tables 1 to 4, it may be appreciated that the acoustic noise may be minimized (30 dB or less) when t/(⅙×π×d$^3$) is 12596.621815 or less, t/(⅙×π×d$^3$) being a value obtained by dividing the thickness (t) of the insulator by the grain volume (⅙×π×d$^3$) of a grain of the dielectric layer.

As set forth above, according to the exemplary embodiment in the present disclosure, the acoustic noise of the multilayer capacitor may be decreased.

While exemplary embodiments have been shown and described above, it will be apparent to those skilled in the art that modifications and variations could be made without departing from the scope of the present disclosure as defined by the appended claims.

What is claimed is:

1. A multilayer capacitor comprising:
a capacitor body including dielectric layers, and first and second internal electrodes that are alternately disposed with the dielectric layers interposed therebetween, and having first and second surfaces opposing each other, third and fourth surfaces connected to the first and second surfaces and opposing each other, and fifth and sixth surfaces connected to the first to fourth surfaces, and opposing each other;

first and second external electrodes disposed on opposite end portions of the capacitor body in a direction perpendicular to the third and fourth surfaces, and connected to the first and second internal electrodes, respectively;

an insulator disposed on the first surface of the capacitor body;

a first conductive resin layer covering the first external electrode and one end portion of the insulator in the direction; and a second conductive resin layer covering the second external electrode and the other end portion of the insulator in the direction, wherein t/(⅙×π×d$^3$) is 12596.621815 or less, t/(⅙×π×d$^3$) obtained by dividing a thickness t of the ins a grain volume ⅙×π×d$^3$ of a grain of the dielectric layer in which d is an average grain size of grains of the dielectric layer.

2. The multilayer capacitor of claim 1, wherein the insulator is disposed to cover the first and second band portions on the first surface of the capacitor body.

3. The multilayer capacitor of claim 1, wherein a ratio of to a height of the multilayer capacitor is 0.169 or less.

4. The multilayer capacitor of claim 1, wherein the capacitor body includes:
an active region in which the first and second internal electrodes alternately disposed with the dielectric layers interposed therebetween, and an upper cover and a lower cover respectively disposed on upper and lower surfaces of the active region, and in the direction perpendicular to the third and fourth surfaces, the insulator at most overlaps the lower cover among the active region, the upper cover, and the lower cover.

5. The multilayer capacitor of claim 1, wherein the first external electrode includes a first connection portion disposed on the third surface of the capacitor body and a first band portion extending from the first connection portion onto a portion of the first surface of the capacitor body, the second external electrode includes a second connection portion disposed on the fourth surface of the capacitor body and a second band portion extending from the second connection portion onto a portion of the first surface of the capacitor body, and in the direction perpendicular to the third and fourth surfaces, the insulator is not disposed on the first and second connection portions.

6. The multilayer capacitor of claim 1, wherein is 22 to 93 μm.

7. The multilayer capacitor of claim 1, wherein the multilayer capacitor has a capacity of 4.7 μF, and
a ratio of t to a height of the multilayer capacitor is 0.033 or less.

8. The multilayer capacitor of claim 1, wherein the multilayer capacitor has a capacity of 4.7 μF, and
t/(⅙×π×d³) is 2137.608550 or less.

9. The multilayer capacitor of claim 1, wherein the multilayer capacitor has a capacity of 4.7 μF,
a ratio of a thickness of the insulator to a height of the multilayer capacitor is 0.033 or less, and
t/(⅙×π×d³) is 2137.608550 or less.

10. The multilayer capacitor of claim 1, wherein the multilayer capacitor has a capacity of 10 μF, and
a ratio of t to a height of the multilayer capacitor is 0.074 or less.

11. The multilayer capacitor of claim 1, wherein the multilayer capacitor has a capacity of 10 μF, and
t/(⅙×π×d³) is 4711.282919 or less.

12. The multilayer capacitor of claim 1, wherein the multilayer capacitor has a capacity of 10 μF,
a ratio of t to a height of the multilayer capacitor is 0.074 or less, and
t/(⅙×π×d³) is 4711.282919 or less.

13. The multilayer capacitor of claim 1, wherein the multilayer capacitor has a capacity of 15 μF, and
a ratio of t to a height of the multilayer capacitor is 0.123 or less.

14. The multilayer capacitor of claim 1, wherein the multilayer capacitor has a capacity of 15 μF, and
t/(⅙×π×d³) is 7279.469165 or less.

15. The multilayer capacitor of claim 1, wherein the multilayer capacitor has a capacity of 15 μF,
a ratio of t to a height of the multilayer capacitor is 0.123 or less, and
t/(⅙×π×d³) is 7279.469165 or less.

16. The multilayer capacitor of claim 1, wherein the multilayer capacitor has a capacity of 2.2 μF, and
a ratio of t to a height of the multilayer capacitor is 0.161 or less.

17. The multilayer capacitor of claim 1, wherein the multilayer capacitor has a capacity of 2.2 μF, and
t/(⅙×π×d³) is 5444.19158 or less.

18. The multilayer capacitor of claim 1, wherein the multilayer capacitor has a capacity of 2.2 μF,
a ratio of t to a height of the multilayer capacitor is 0.161 or less, and
t/(⅙×π×d³) is 5444.19158 or less.

19. The multilayer capacitor of claim 1, wherein the first and second external electrodes include copper.

20. The multilayer capacitor of claim 1, wherein the first and second conductive resin layers include a conductive metal and a resin.

21. The multilayer capacitor of claim 1, wherein the first and second external electrodes include copper, and
the first and second conductive resin layers include a conductive metal and a resin.

22. The multilayer capacitor of claim 1, wherein the insulator includes epoxy.

23. The multilayer capacitor of claim 1, further comprising first and second plating layers covering the first and second conductive resin layers, respectively.

24. The multilayer capacitor of claim 23, wherein the first and second plating layers include first and second nickel plating layers covering, respectively, the first and second conductive resin layers, and first and second tin plating layers covering, respectively, the first and second nickel plating layers.

25. The multilayer capacitor of claim 1, wherein the multilayer capacitor has a length of 1.3 mm or less in the direction perpendicular to the third and fourth surfaces of the capacitor body, and has a length of 0.65 mm or less in a direction perpendicular to the fifth and sixth surfaces of the capacitor body.

26. The multilayer capacitor of claim 1, wherein among the first and second surfaces of the capacitor body, the insulator is disposed only on the first surface.

27. A board component having a multilayer capacitor, comprising:
a board having first and second electrode pads disposed on one surface thereof; and
a multilayer capacitor,
wherein the multilayer capacitor includes:
a capacitor body including dielectric layers, and first and second internal electrodes that are alternately disposed with the dielectric layers interposed therebetween, and having first and second surfaces opposing each other, third and fourth surfaces connected to the first and second surfaces and opposing each other, and fifth and sixth surfaces connected to the first to fourth surfaces, and opposing each other;
first and second external electrodes disposed on opposite end portions of the capacitor body in a direction perpendicular to the third and fourth surfaces, and connected to the first and second internal electrodes, respectively;
an insulator disposed on the first surface of the capacitor body;
a first conductive resin layer covering the first external electrode and one end portion of the insulator in the direction;
a second conductive resin layer covering the second external electrode and the other end portion of the insulator in the direction; and
first and second plating layers covering the first and second conductive resin layers, respectively,
the multilayer capacitor is mounted such that the first and second plating layers are connected to the first and second electrode pads, respectively, and
wherein t/(⅙×π×d³) is 12596.621815 or less, t/(⅙×π×d³) obtained by dividing a thickness t of the ins a grain volume ⅙×π×d³ of a grain of the dielectric layer in which d is an average grain size of grains of the dielectric layer.

28. The board component of claim 27, wherein the first and second plating layers of the multilayer capacitor are mounted on the first and second electrode pads, respectively, so that the insulator faces the board.

29. The multilayer capacitor of claim 1,
the first external electrode includes a first connection portion disposed on the third surface of the capacitor body and a first band portion extending from the first connection portion onto a portion of the first surface of the capacitor body,
the second external electrode includes a second connection portion disposed on the fourth surface of the capacitor body and a second band portion extending from the second connection portion onto a portion of the first surface of the capacitor body, and
in the direction perpendicular to the third and fourth surfaces, a length of the insulator is no more than a distance between an outer surface of the first connection portion and an outer surface of the second connection portion.

30. The board component of claim 27, wherein the capacitor body includes:
   an active region in which the first and second internal electrodes are alternately disposed with the dielectric layers interposed therebetween, and
   an upper cover and a lower cover respectively disposed on upper and lower surfaces of the active region, and
   in the direction perpendicular to the third and fourth surfaces, the insulator at most overlaps the lower cover among the active region, the upper cover, and the lower cover.

31. The board component of claim 27, wherein the first external electrode includes a first connection portion disposed on the third surface of the capacitor body and a first band portion extending from the first connection portion onto a portion of the first surface of the capacitor body,
   the second external electrode includes a second connection portion disposed on the fourth surface of the capacitor body and a second band portion extending from the second connection portion onto a portion of the first surface of the capacitor body, and
   in the direction perpendicular to the third and fourth surfaces, the insulator is not disposed on the first and second connection portions.

* * * * *